Aug. 25, 1931.                H. ALBERTINE                 1,820,109
LUBRICATING SYSTEM
Filed May 6, 1927
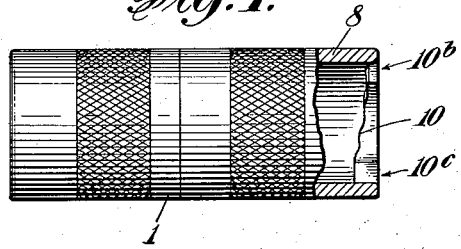
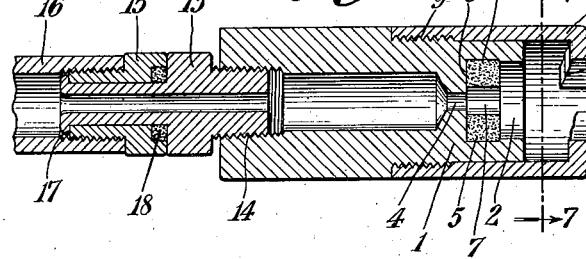 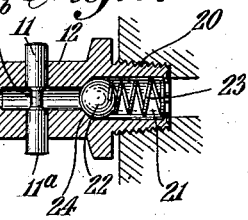
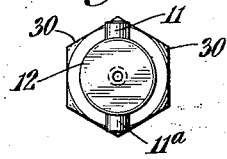 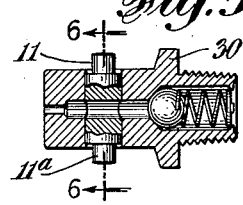
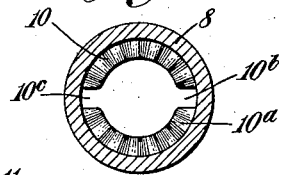 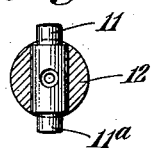
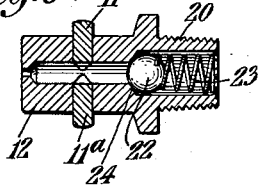 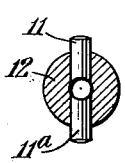
INVENTOR
*Herman Albertine.*
BY
ATTORNEY Patented Aug. 25, 1931

1,820,109

UNITED STATES PATENT OFFICE

HERMAN ALBERTINE, OF EAST RUTHERFORD, NEW JERSEY, ASSIGNOR, BY MESNE ASSIGNMENTS, TO ROGERS PRODUCTS CO. INC., A CORPORATION OF NEW JERSEY

LUBRICATING SYSTEM

Application filed May 6, 1927. Serial No. 189,210.

My present invention relates to detachable couplings and nipples adapted for use in connection with force feed lubricators or grease guns, particularly those of the extremely high pressure types, such as shown in the application of Charles L. Zabriskie, Ser. No. 74,680. The coupling is one of the forms shown in my own prior application Ser. No. 132,454. As stated in said applications, my complete system is designed to supply oil or grease to bearings, either through the usual valved nipples in accordance with the system described in British patent to Alley, et al., No. 21,893 of 1906, or by screwing the coupling into the threaded end of the duct after the grease cup, nipple or other fitting has been removed. As also explained in said application such ducts, or the nipples that lead to them, particularly on automobiles, trucks, etc., frequently become clogged with dirt, hardened lubricant, etc., requiring pressures in the neighborhood of 10,000 to 20,000 pounds per square inch or higher in order to blow them clear.

As concerns the coupling element of the system, my invention contemplates the employment of a very simple type of joint in which there is a stationary packing in the form of a flat washer of yielding material such as leather which is crowded against the support by an advancing screw head whereby the support and packing may be screwed against the head of a fitting or nipple to whatever extent is necessary to make a tight joint and compensate for compression or wear of the packing. I have discovered that by employing a screw coupling means of pitch even less than shown in said patent to Alley, a joint may be readily obtained which is more reliable and will stand higher pressures than any heretofore known. The screw means which I employ for this purpose is easily capable of withstanding grease gun pressures up to 30,000 pounds or more per square inch, without distortion or breakage, while the packing remains tight when subjected to even higher pressures.

As concerns the nipple or fitting element of the system, my invention contemplates employment of a relatively massive design adapted to withstand the strains that can be applied by the screw plus the above described high pressure of the grease. To this end, the walls of the nipple are made extremely thick, this being made possible, without increasing the natural convenient diameter for the nipple, by my discovery that for high pressure lubrication, the entrance opening into the nipple may be relatively minute; also that where such small passage is employed, the check valve may be located in the base of the fitting instead of at the entrance end thereof as in the Alley patent. Actual experiment shows that with a ball closure at the end of the fitting as in prior patented devices, the ball affords very limited protection from entrance of dirt into the fitting. In practice, it is found that dirt will collect in the annular space or groove around the ball and on the face of the nipple and when the garage man attempts to replenish the grease, he either applies the coupling without wiping off the end face of the nipple, in which case all the dirt is carried into the duct by the grease; or, if he does wipe the end of the nipple, he will use force enough to depress the ball closure, in which case the dirt is wiped into the duct; or, if he wipes gently enough not to depress the ball, a substantial ring of dirt will remain around the joint between the ball and the face of the nipple and will be carried into the duct by the grease. I find that in the case of my relatively minute outer orifice with no closure except the grease from the last charging, the amount of dirt that will enter the duct is small as compared with prior devices wherein there is an outer ball closure as above described. The reason is that the exposed area of my entrance hole is only a very minute fraction of area of the annular groove around projecting ball closure of the prior art.

Arrangement of the ball valve in the base of the nipple makes it possible and desirable to dispense with the cross-pin that is commonly used as the anchorage for the valve spring, the projections to be engaged by the coupling being merely projecting studs and the axial passage being entirely unobstructed.

While the coupling and nipple combination, in accordance with my present invention is particularly adapted for withstanding such high pressures, it is also useful in connection with the very much lower pressures such as are commonly attainable in ordinary screw pressure grease guns such as shown in said patent to Alley.

The above and other features of my invention will be more evident from the following detailed description in connection with the accompanying drawings, in which Fig. 1 is a side elevation, partly in section, showing one form of my coupling;

Figs. 2 and 3 are axial sections through the coupling and nipple, respectively;

Figs. 3a and 3b are respectively axial and cross-sections showing a modified form of nipple;

Fig. 4 is a top plan view of a nipple such as shown in Figs. 3 and 3a;

Fig. 5 is an axial section of another modified form of nipple;

Fig. 6 is a section on the line 6—6, Fig. 5; and

Fig. 7 is a transverse section on the line 6—6, of Fig. 2, showing a face view of the screw element of the nipple.

As shown in Figs. 1, 2 and 7, the detachable coupling member is shown as comprising a head 1, having a cylindrical recess 2, having an annular support surface 3 surrounding a grease inlet hole 4 and supporting a stationary annular washer 5 of suitable yielding or compressible material such as leather, which fits snugly against the surrounding wall 6 of the cylindrical recess 2 so that expansion of the washer under pressure is prevented and the expansion forces take effect longitudinally in the direction of thickness of the washer, thereby perfecting and maintaining sealing contact with the end of the nipple as hereinafter described. The hole 7 through the annular washer is preferably larger than the hole 4, so that the entering grease cannot get behind the washer or cause any tendency to force the same forward. Screw elements are provided for forcing the packing washer against the end of a nipple, in the form of a sleeve 8 secured to the head in any desired way, as by screw-threads 9, and formed at the open forward end with internal screw surfaces 10, 10a, each comprising nearly a half turn of what is in effect a double threaded screw.

The double thread screw elements 10, 10a engage respectively projections 11, 11a on the exterior of a cylindrical nipple 12. The recess 2 in the head and the registering opening in the screw member 8 are of proper size for loose fit of the forward end of said nipple 12, while the slots 10b, 10c (most clearly shown in Fig. 7) are of proper diameter to receive the projections 11, 11a.

The head being applied to the nipple so as to bring said projections within range of the screw-threads 10, 10a, and the end of the nipple 12 in contact with the front face of the washer or packing 5, the head is rotated sufficiently to compress the packing between the end of the nipple and the stationary support 3. In practice, much less than a half turn of a screw of the pitch shown is found sufficient to compress the washer, take up for wear and make a tight joint under all conditions of use. In cases where the thread is so steep as to cause danger of slip and unscrewing when great pressure is applied, the engaging surfaces of the threads 10, 10a may be roughened as shown.

The required rotary movement of the head is provided for by a simple form of swivel comprising a tubular member 13 having its front end taper-threaded tightly into the rear end of the head 1, as shown at 14. Mounted on a tubular rearward extension of 13, is a cooperating member 15 of the swivel coupling, which is similarly tightly screw-threaded to the conduit 16 through which the grease is supplied from a suitable pressure source. The member 15 is rotatably held in its position by an annular lip 17, spun over from and integral with the rearward tubular extension on which 15 is mounted. If desired, a packing washer 18 may be interposed between adjacent surfaces of the swivel members, mainly for the purpose of preventing the turned over collar 17 from squeezing the member 15 too tightly against 13.

The construction of the nipple 12 is entirely novel. Three desirable forms are shown in Figs. 3 to 6 inclusive. In all three forms, certain features of the nipple may be the same. For instance, the nipple being adapted to replace grease cups and the like on automobiles and the size, pitch and taper of the screw thread 20 leading to the oil ducts of automobiles having been standardized, the screw thread 20 will have to conform to such standard, which is in fact the accepted standard for 1/8 inch pipe having an external diameter of approximately 0.4 inch. Conformably to this, the external diameter of the body portion 12 is approximately 0.4 inch. The depth of the recess 2 in the coupling should preferably be sufficient to safely hold the washer 5, and the space between the front face of the head and the screw threads 10, 10a, must be sufficient for clearance of the studs 11, 11a. Consequently, the length of the projecting end of the nipple and the position of the studs is practically predetermined, as shown.

The remaining features are novel and are subject to greater variation in practice.

The large diameter part of the grease passage at 21 necessary for housing the valve ball 22 and the closing spring 23 are in the rear end of the nipple, which screws into the solid iron or steel of the part to be lubricated, thus leaving the forward operative end of the nipple practically free of limitations as to the thickness of its walls. Consequently, the valve seat 24 may be made broad and backed by almost any desired thickness of metal. This is a great improvement over certain prior devices wherein the valve seat is formed merely by a flimsy inturned flange at the face end of the tube. Such flanges will stand up under, say, 2,000 or 3,000 pounds of back pressure of grease charged into the bearing but, as is well known, pressures higher than 4,000 pounds are not recommended because when higher pressures are used, the ball acting as a mandrel straightens the flange and blows out, leaving the nipple without any closure at all. As contrasted with this, the ball and valve seat arranged as I have shown it, will stand back pressures far above 30,000 pounds per square inch.

Another advantage of thus using the ball check as a valve to hold back pressure rather than as a mere closure for the end of the nipple, is rendering possible the above described small diameter for the inlet passage to the ball. Thus the walls 12 being very thick, afford an anchorage for the projecting steel lugs 11, 11a. In all cases preferably the lugs project from the nipple the shortest distance practical for engagement of the coupling screws, say, $\frac{3}{32}$ of an inch, and the diameter or thickness of these lugs is preferably greater than the distance they project. As a result of the redesigning and great thickening of the walls of the nipple made possible by my invention, lugs of the proportions shown will hold against grease pressures of 20,000 to 30,000 pounds or more, whereas the ordinary cross-pins in the thin wall tubes required for ball closures at the end of the nipple, will usually shear off at much lower grease pressures, say, 10,000 to 15,000 pounds per square inch.

As concerns strain on the lugs, it may be noted that in the case of my flat packing washer, 5, crowded rearward against its support in the head, the grease pressure on the washer is primarily applied, not against the rear face as in the case of a cup washer, but radially outward on the walls of the perforation. While such pressure is on, it tends to enlarge the peforation but radial expansion is prevented by encircling walls and therefore takes effect longitudinally against the end of the nipple to maintain a perfect seal. When the pressure is removed and the leather contracts again, a certain amount of grease will be squeezed out, but as the packing is clamped between its support and the end of the nipple and is confined by rigid encircling walls of the recess 6, the amount of grease so wasted is unimportant.

So far as concerns the above features of my invention, it is possible to have the lugs 11, 11a in the form of a cross-pin extending entirely through the nipple, but in such case its diameter has to be reduced at the center as shown at 11b in order to allow sufficient space for flow of the grease, when the walls are made as thick as shown.

I have discovered, however, that the above limitation imposed by having a through-extending cross-pin can be obviated as shown in Figs. 3a and 3b, in which the lugs 11, 11a are merely the ends of two separate studs, instead of being opposite ends of one integral cross-pin. Because the axial passage may be very small and the walls of the nipple as thick as desired, such studs will not pull out of their anchorage in the brass walls and being of steel and of the proportions above described, will not shear off under the above described high pressures. A cheap way of forming these separate studs is to form the exterior of the fitting, then form a transverse passage and drive in a steel cylinder of the proper length and diameter and thereafter drill the central hole in the brass, incidentally severing the pin into two lugs, as shown in Figs. 3a and 3b.

If the lugs are of large enough diameter or the axial bore is small enough, the pin will not be severed but will simply have the hole formed through it as shown in Figs. 5 and 6. These forms shown in Figs. 3a, 3b and Figs. 5 and 6 leave the passage for entrance of grease to the ball entirely unobstructed and are therefore preferable to the form shown in Fig. 3 and in practice the forms shown in Figs. 3a and 3b are preferred.

A minor feature of my invention made possible by the shortness of the studs 11, 11a is making the corner to corner diameter of the hexagonal collar 30 slightly greater than the stud projection, as shown in Fig. 4, so that a wrench may properly be applied to the hexagonal collar 30 without the necessity for also engaging with the studs, as frequently happens where a long cross-pin is used. Even when a wrench is applied to my lugs, the danger of twisting them out is far less than in prior devices because they are so stubby as well as deeply anchored in thick walls.

I claim:—

1. A lubricating system, including a brass nipple having a screw-threaded base adapted to fit a grease conduit, a wrench engaging portion of larger diameter than said base and a body portion having a passage extending therethrough which is of relatively small diameter to afford thick walls, throughout said body portion of the nipple, which has a relatively small opening at the grease receiving end thereof, and which is enlarged rearwardly of said opening to afford a solid valve seat; a rearwardly opening check valve with a spring anchored in the rear end of the nipple tending to hold said valve closed; and transversely projecting steel arms having a drive fit in the thick brass walls of said body portion of the nipple.

2. A lubricating system, including a nipple having a screw-threaded base adapted to fit a grease conduit, and having a cylindrical body portion of larger diameter than said base and having a passage extending therethrough which is of relatively small diameter to afford thick walls throughout said body portion of the nipple, which has a relatively minute opening at the grease receiving end thereof, and which is enlarged toward the rear end to afford a solid valve seat; a rearwardly opening check valve with a spring anchored in the rear end of the nipple tending to hold said valve closed; studs anchored in the thick walls of said body portion of the nipple and projecting from opposite sides thereof each a distance less than the thickness of the stud.

3. A lubricating system, including a nipple having a screw-threaded base adapted to fit a grease conduit, and having a cylindrical body portion of larger diameter than said base and having a passage extending therethrough which is of relatively small diameter to afford thick walls throughout said body portion of the nipple, which has a relatively minute opening at the grease receiving end thereof, and which is enlarged toward the rear end to afford a solid valve seat; a rearwardly opening check valve with a spring anchored in the rear end of the nipple tending to hold said valve closed; studs anchored in the thick walls of said body portion of the nipple, and projecting from opposite sides thereof, the anchored portion of each stud being longer than the projecting portion.

4. A lubricating system, including a nipple having a screw-threaded base adapted to fit a grease conduit, and having a cylindrical body portion of larger diameter than said base and having a passage extending therethrough which is of relatively small diameter to afford thick walls throughout said body portion of the nipple, which has a relatively minute opening at the grease receiving end thereof, and which is enlarged toward the rear end to afford a solid valve seat; a rearwardly opening check valve with a spring anchored in the rear end of the nipple tending to hold said valve closed; studs anchored in the thick walls of said body portion of the nipple and projecting from opposite sides thereof each a distance less than the thickness of the stud, the portion of each stud anchored in the thick walls of said body portion being longer than the projecting portion of said stud.

5. A lubricating system, including a nipple having a screw-threaded base, a body portion, and an intermediate flat ended wrench engaging portion of larger diameter than said body portion; said nipple having a passage extending therethrough which is of relatively small diameter to afford thick walls and a small inlet opening for the grease receiving end of the nipple, in combination with studs anchored in and tightly fitting passages extending through the thick walls of the nipple, said studs extending to said small diameter passage and projecting from opposite sides thereof each a distance less than the wrench engaging portion.

Signed at New York, in the county of New York, and State of New York this 5th day of May, A. D. 1927.

HERMAN ALBERTINE.